US012722383B2

(12) United States Patent
Nagashima et al.

(10) Patent No.: US 12,722,383 B2
(45) Date of Patent: Sep. 1, 2026

(54) CARTRIDGE, PRINTING DEVICE, AND PRINTING SYSTEM

(71) Applicant: SEIKO EPSON CORPORATION, Tokyo (JP)

(72) Inventors: Takumi Nagashima, Matsumoto (JP); Yoshihiro Koizumi, Shiojiri (JP); Shun Oya, Kiso-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 125 days.

(21) Appl. No.: 18/927,468

(22) Filed: Oct. 25, 2024

(65) Prior Publication Data

US 2025/0135787 A1 May 1, 2025

(30) Foreign Application Priority Data

Oct. 26, 2023 (JP) ................................ 2023-183805

(51) Int. Cl.
*B41J 2/175* (2006.01)

(52) U.S. Cl.
CPC ....... *B41J 2/17523* (2013.01); *B41J 2/17526* (2013.01); *B41J 2/17553* (2013.01)

(58) Field of Classification Search
CPC ......................... B41J 2/17523; B41J 2/17526; B41J 2/17553; B41J 2/1752
See application file for complete search history.

(56) References Cited

U.S. PATENT DOCUMENTS

2016/0375688 A1* 12/2016 Kodama .............. B41J 2/17523 347/86
2023/0347653 A1 11/2023 Nagashima et al.
2024/0184240 A1* 6/2024 Oya ................... G03G 21/1814

FOREIGN PATENT DOCUMENTS

AU 2012101587 A4 * 11/2012 .......... B41J 2/17503
JP 2022-053794 A 4/2022
TW 1290102 B * 11/2007 ............ B41J 2/1752

* cited by examiner

*Primary Examiner* — Sharon Polk
(74) *Attorney, Agent, or Firm* — Oliff PLC

(57) ABSTRACT

A cartridge detachably mounted to a printing device cartridge mounting portion includes a second fixing structure including a groove guiding a first fixing structure, and a locking portion provided to the groove. The cartridge is brought from a cartridge insertion state to a cartridge mounting portion predetermined position by being moved along a horizontal direction to a mounting state in which the cartridge is mounted by being rotated and moved in a rotation mounting direction around a fulcrum which is a far side of the cartridge mounting portion in the insertion direction by receiving a force having a component in a downward direction of a gravity direction. The second fixing structure locks the first fixing structure in the mounting state and releases with the first fixing structure by receiving the force having the component in the downward direction of the gravity direction applied to the cartridge in the mounting state.

6 Claims, 12 Drawing Sheets

CARTRIDGE, PRINTING DEVICE, AND PRINTING SYSTEM

The present application is based on, and claims priority from JP Application Serial Number 2023-183805, filed Oct. 26, 2023, the disclosure of which is hereby incorporated by reference herein in its entirety.

BACKGROUND

1. Technical Field

The present disclosure relates to a cartridge, a printing device, and a printing system.

2. Related Art

In the related art, there has been known a cartridge to be mounted to a printing device by a combination of a horizontal insertion movement into the printing device and a downward rotational movement in a gravity direction. JP-A-2022-53794 is an example of the related art of the cartridge. This cartridge includes a cartridge engagement portion which is a fixing structure configured to maintain a mounting state and which is configured to be engaged with a mounting engagement portion of the printing device. The engagement of the mounting engagement portion and the cartridge engagement portion is released by lifting a rear wall side of the cartridge.

The cartridge of the related art is mounted to the printing device by pushing an upper wall downward in the gravity direction. On the other hand, in a case in which the mounting state of the cartridge is released, the force in the upward direction is applied to a side wall and a bottom wall of the cartridge, so that the rear wall side of the cartridge is lifted. As described above, the different walls of the cartridge are used at the attachment and the detachment of the cartridge. Accordingly, this may cause a problem in which the consistency is not provided in the operability at the attachment and the detachment of the cartridge.

SUMMARY

The present disclosure can be attained as below-described aspects.

(1) According to a first aspect of the present disclosure, there is provided a cartridge configured to be detachably mounted to a cartridge mounting portion of a printing device. The cartridge includes a second fixing structure including a groove which has a loop shape and which is configured to guide a first fixing structure of the printing device and a locking portion provided to the groove and configured to lock the first fixing structure. The cartridge is configured to be brought from an insertion state to a mounting state. The insertion state is a state in which the cartridge is inserted to a predetermined position of the cartridge mounting portion by being moved in an insertion direction along a horizontal direction. The mounting state is a state in which the cartridge is mounted in the cartridge mounting portion by being rotated and moved in a rotation mounting direction around a rotation fulcrum which is a far side of the cartridge mounting portion in the insertion direction by receiving a force having a component in a downward direction of a gravity direction. The second fixing structure is configured to lock the first fixing structure in the mounting state. The second fixing structure is configured to release locking with the first fixing structure by receiving the force having the component in the downward direction of the gravity direction which is applied to the cartridge in the mounting state.

(2) According to a second aspect of the present disclosure, there is provided a printing device. The printing device includes a cartridge mounting portion to and from which a cartridge is attached and detached, a first fixing structure, and a second fixing structure. The cartridge mounting portion is configured to be brought from an insertion state to a mounting state. The insertion state is a state in which the cartridge mounting portion supports the cartridge inserted to a predetermined position in an insertion direction along a horizontal direction. The mounting state is a state in which the cartridge mounting portion mounts the cartridge by being rotated and moved in a rotation mounting direction around a rotation fulcrum which is a far side of the cartridge mounting portion in the insertion direction by receiving a force having a component in a downward direction of a gravity direction. The second fixing structure includes a groove which has a loop shape and which is configured to guide the first fixing structure of the printing device, and a locking portion provided to the groove and configured to lock the first fixing structure. The first fixing structure and the second fixing structure are locked with each other in the mounting state, and locking between the first fixing structure and the second fixing structure is released by receiving the force having the component in the downward direction of the gravity direction in the mounting state.

DESCRIPTION OF EMBODIMENTS

A. First Embodiment

Figure 1:
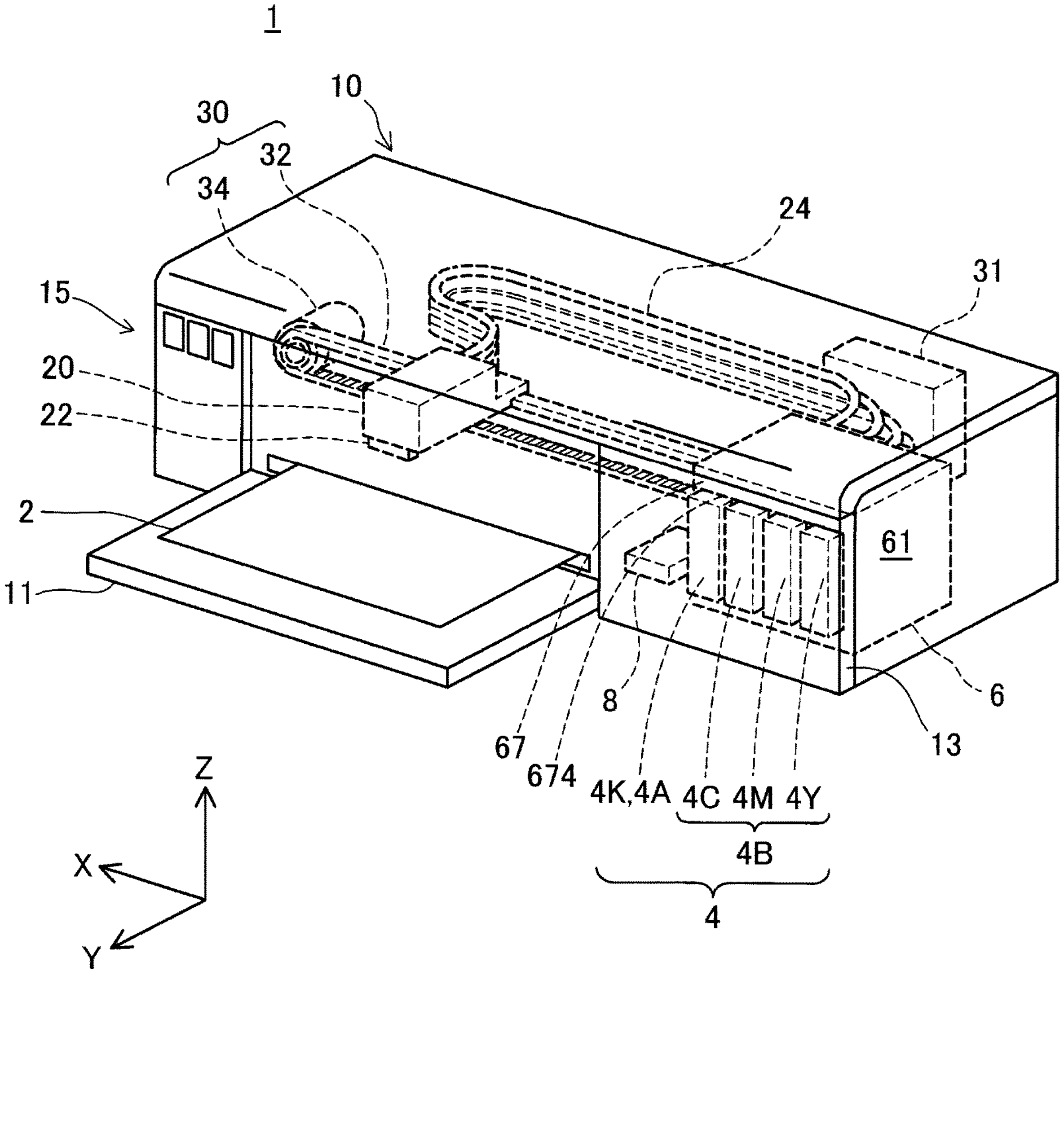
FIG. 1 is a perspective view illustrating a configuration of a printing system according to a first embodiment.

FIG. 1 is a perspective view illustrating a configuration of a printing system 1 according to a first embodiment. An X axis, a Y axis, and a Z axis are drawn in FIG. 1. The X axis, the Y axis, and the Z axis are three space axes perpendicular to one another. Directions directed by the X axis, the Y axis, and the Z axis are, respectively, positive directions along the X axis, the Y axis, and the Z axis. The positive directions along the X axis, the Y axis, and the Z axis are, respectively, a +X direction, a +Y direction, and a +z direction. Directions opposite to the directions directed by the X axis, the Y axis, and the Z axis are, respectively, negative directions along the X axis, the Y axis, and the Z axis. The negative directions along the X axis, the Y axis, and the Z axis are, respectively, a −X direction, a −Y direction, and a −Z direction. When no distinction is made between the positive and negative directions, the directions along the X axis, the Y axis, and the Z axis which are referred to, respectively, as an X direction, a Y direction, and a Z direction. The same applies to drawings and explanations described below.

The printing system 1 includes a printing device 10 and cartridges 4 configured to supply an ink which is a liquid to the printing device 10.

The printing device 10 according to the embodiment is an ink jet printer configured to eject the ink which is the liquid from an ejection head 22. This printing device 10 is a large printer configured to print on a large-sized sheet such as a poster. The printing device 10 includes a cartridge mounting portion 6, a control section 31, a carriage 20, the ejection head 22, and a driving device 30. Moreover, the printing device 10 includes operation buttons 15 by which a user operates the printing device 10.

The cartridge mounting portion 6 includes a first mounting wall 67 positioned on the +Y direction side. The first mounting wall 67 includes an insertion/extraction opening portion 674 which is an inlet/outlet portion to a receiving chamber 61 for the cartridges 4. The cartridges 4 are configured to be received within the receiving chamber 61 of the cartridge mounting portion 6 through the extraction/insertion opening portion 674 and to be detached from the receiving chamber 61 of the cartridge mounting portion 6 through the extraction/insertion opening portion 674. A plurality of cartridges 4 are mounted in the cartridge mounting portion 6 to be detachable from the cartridge mounting portion 6. In this embodiment, four types of the cartridges 4 corresponding to inks of four colors of black, yellow, magenta, and cyan, that is, the four cartridges 4 in total are mounted in the cartridge mounting portion 6. One of the cartridges 4 which contains the black ink is also referred to as a cartridge 4K. One of the cartridges 4 which contains the yellow ink is also referred to as a cartridge 4Y. One of the cartridges 4 which contains the magenta ink is also referred to as a cartridge 4M. One of the cartridges 4 which contains the cyan ink is also referred to as a cartridge 4C. In this embodiment, the cartridge 4K is configured to contain a larger amount of liquid than those of the cartridges 4C, 4M, and 4Y. Accordingly, the cartridge 4K is also referred to as a first type cartridge 4A. The cartridges 4C, 4M, and 4Y are also referred to as second type cartridges 4B.

The printing device 10 includes a replacement cover 13 on a front surface on the +Y direction side. The replacement cover 13 is configured to be opened/closed. The replacement cover 13 is opened to expose an opening of the cartridge mounting portion 6, so that the cartridges 4 can be attached to and detached from the cartridge mounting portion 6. When the cartridges 4 are mounted in the cartridge mounting portion 6, the inks can be supplied through tubes 24 which are liquid flowing conduits, to the ejection head 22 provided to the carriage 20. In this embodiment, the inks are supplied from the cartridges 4 to the ejection head 22 by using the water head difference. Specifically, the inks are supplied to the ejection head 22 by the water head difference between the ejection head 22 and an ink liquid level within the cartridge mounting portion 6. The printing device 10 may be configured to suck the inks within the cartridges 24 by a pump mechanism (not shown) and to supply the inks to the ejection head 22. The tubes 24 are provided for the respective inks. In this disclosure, a state in which the cartridges 4 are mounted in the cartridge mounting portion 6 and in which the ink which is the liquid can be supplied to the printing device 10 is also referred to as a "mounting state".

The ejection head 22 are provided with nozzles for the respective inks. The ejection head 22 is configured to eject the inks from the nozzles toward a printing sheet 2 and to print data such as characters or images. In this embodiment, the printing device 10 is an "off-carriage type" printer in which the cartridge mounting portion 6 is not interlocked with the movement of the carriage 20. The printing device 10 may be an "on-carriage type" printer in which the cartridge mounting portion 6 is provided to the carriage 20 and in which the cartridge mounting portion 6 is moved with the carriage 20.

The control section 31 is configured to control various portions of the printing device 10 and to receive and transmit signals from and to the cartridges 4. The carriage 20 is configured to relatively move the ejection head 22 with respect to the printing sheet 2.

The driving device 30 is configured to reciprocate the carriage 20 based on the control signal from the control section 31. The driving device 30 includes a timing belt 32 and a driving motor 34. The carriage 20 is configured to receive the power from the driving motor 34 through the timing belt 32 and to thereby be reciprocated in a main scanning direction along the X direction. Moreover, the printing device 10 includes a transport mechanism configured to move the printing sheet 2 in a sub scanning direction which is the +Y direction. At the printing, the printing sheet 2 is moved in the sub scanning direction by the transport mechanism. Then, the printed printing sheet 2 is outputted onto a front cover 11.

In this embodiment, in the usage state of the printing system, the Y axis is an axis along the sub scanning direction in which the printing sheet 2 is transported. The Z axis is a direction along the gravity direction. The X axis is an axis along the movement direction of the carriage 20. In this case, the "usage state of the printing system 1" is a state in which the printing system 1 is disposed on a horizontal surface. Moreover, in this embodiment, the +Y direction is the sub scanning direction. The −Y direction is a direction opposite to the sub scanning direction. The −Z direction is the downward direction of the gravity direction. The +Z direction is the upward direction of the gravity direction. The X direction and the Y direction are directions along the horizontal direction. Moreover, the +X direction is a direction from the right side toward the left side when the printing system 1 is viewed from the front side. The −X direction is a direction from the left side toward the right side when the printing system 1 is viewed from the front side. Furthermore, in this embodiment, the −Y direction is an insertion direction in which the cartridge 4 is inserted into the cartridge mounting portion 6 for the mounting. The +Y direction is a direction in which the cartridge 4 is detached from the cartridge mounting portion 6. Accordingly, in the cartridge mounting portion 6, the −Y direction side is also referred to as a far side. The +Y direction side is also referred to as a near side. Moreover, in this embodiment, the X direction is an arrangement direction of the plurality of cartridges 4.

Figure 2:
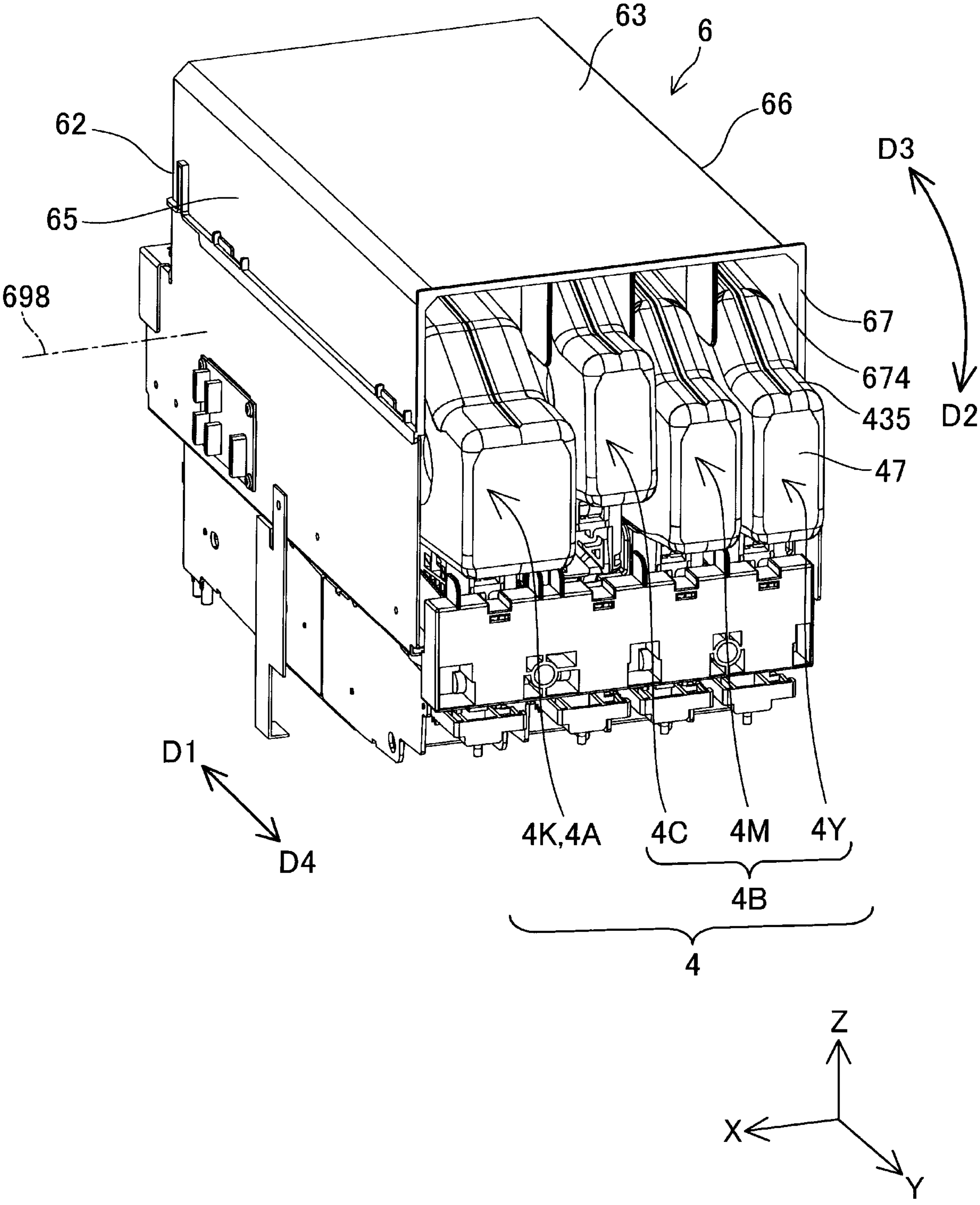
FIG. 2 is a view for explaining a cartridge mounting portion and a cartridge.

FIG. 2 is a view for explaining the cartridge mounting portion 6 and the cartridges 4. In FIG. 2, the cartridges 4K, 4M, and 4Y are in the mounting state in which the mountings of the cartridges 4K, 4M, and 4Y to the cartridge mounting portion 6 are finished. Moreover, in FIG. 2, the cartridge 4C is in a state in which the insertion of the cartridge 4C to the cartridge mounting portion 6 is finished. Note that, in this disclosure, the state in which the insertion of the cartridge 4 into the cartridge mounting portion 6 is finished is also referred to as an "insertion state".

The cartridges 4 are detachably mounted in the cartridge mounting portion 6. Each of the cartridges 4 is configured to be brought from the insertion state to the mounting state. The insertion state is a state in which each cartridge 4 is inserted into a predetermined position of the cartridge mounting portion 6 by being moved in an insertion direction D1 along the horizontal direction. The mounting state is a state in which each cartridge 4 is mounted in the cartridge mounting portion 6 by being rotated and moved in a rotation mounting direction D2 around a rotation fulcrum 698 which is the far side of the cartridge mounting portion 6 in the insertion direction D1, by receiving a force having a component in the downward direction of the gravity direction. Specifically, when the cartridges 4 are mounted in the cartridge mounting portion 6, a mounting process is performed. The mounting process includes a terminal connection process and a supply portion connection process performed subsequently to the terminal connection process. The terminal connection process is a process in which each cartridge 4 is moved through the insertion/extraction opening portion 674 of the first device wall 67 in the insertion direction D1 along the horizontal direction to be inserted into the receiving chamber 61 of the cartridge mounting portion 6 to be inserted into the predetermined position. The predetermined position is a position at which contact between a cartridge side terminal (described later) of the cartridge 4 and a device side terminal (described later) of the cartridge mounting portion 6 is finished. The supply portion connection process is a process in which a liquid inlet portion (described later) of the cartridge mounting portion 6 and a liquid supply portion (described later) of each cartridge 4 are connected in a state in which the contact between the device side terminal and the cartridge side terminal are maintained. Specifically, in the supply portion connection process, each cartridge 4 is rotated and moved in the rotation mounting direction D2 shown by an arrow around the rotation fulcrum 698 of the cartridge mounting portion 6 by receiving the force acted on the operation surface 435 of the cartridge 4 in the downward direction of the gravity direction, so that the liquid inlet portion and the liquid supply portion are connected with each other. In the mounting state, a second fixing structure (described later) of the cartridge 4 is configured to lock a first fixing structure (described later) provided to the cartridge mounting portion 6 to maintain the mounting state.

In a case in which each cartridge 4 is detached from the cartridge mounting portion 6, the user pushes the operation surface 435 of the cartridge 4 in the rotation mounting direction D2. With this, locking between the first fixing structure provided to the cartridge mounting portion 6 and the second fixing structure provided to each cartridge 4 is released. When the locking between the first fixing structure and the second fixing structure is released, the cartridge 4 is rotated and moved in a connection releasing direction D3 opposite to the rotation mounting direction D2, by a force of an urging member (described later) of the cartridge mounting portion 6, and is brought from the mounting state to the insertion state. By moving the cartridge 4 in the +Y direction which is a detachment direction D4 after the cartridge 4 is brought to the insertion state, the cartridge 4 is detached from the cartridge mounting portion 6. A mechanism in which the second fixing structure locks the first fixing structure and a mechanism in which the locking is released are described later.

Figure 3:
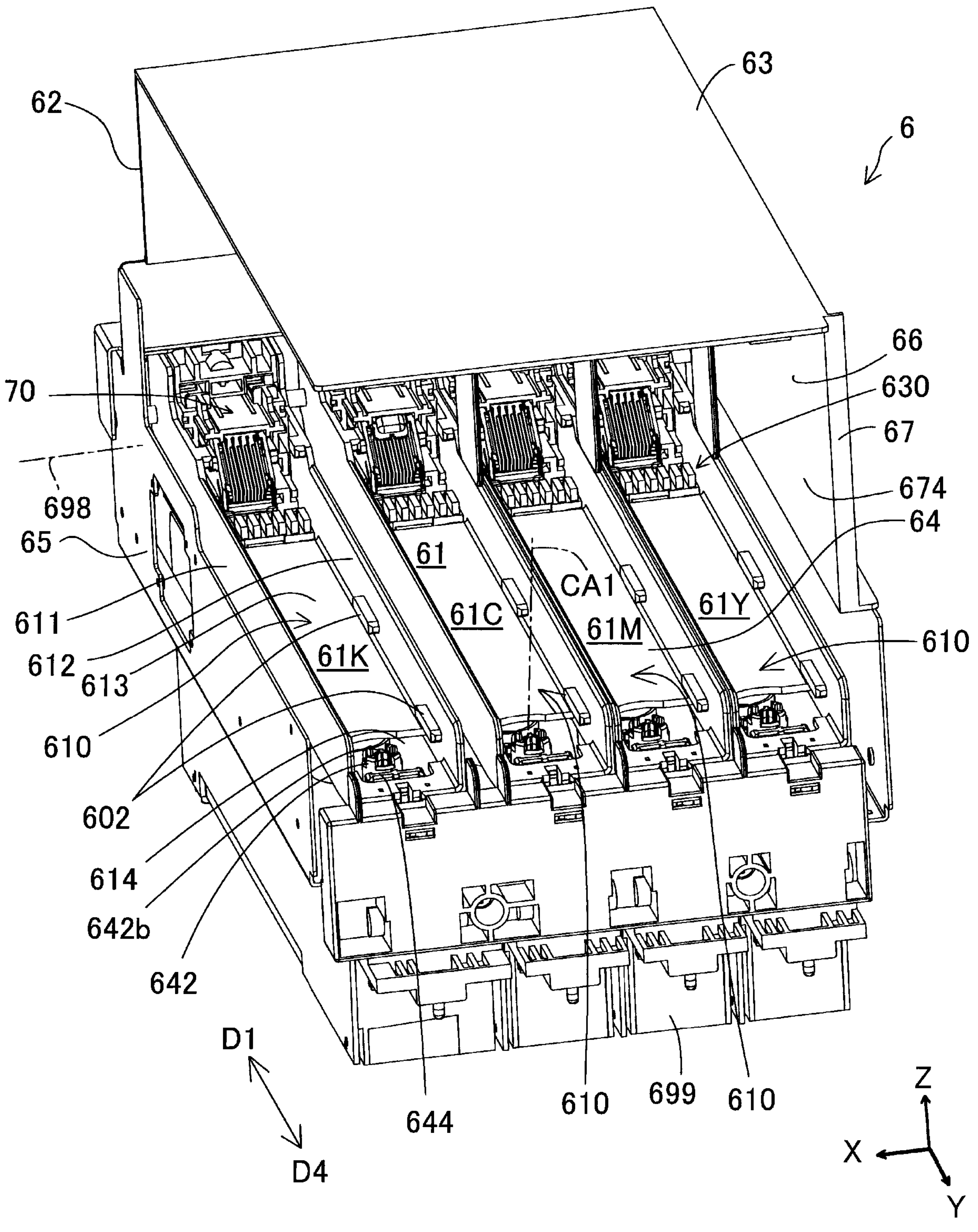
FIG. 3 is a perspective view of the cartridge mounting portion.

FIG. 3 is a perspective view illustrating the cartridge mounting portion 6. In FIG. 3, a portion of the configuration of the cartridge mounting portion 6 is omitted. In the cartridge mounting portion 6, the X direction is also referred to as a widthwise direction. The Y direction is also referred to as a depth direction. The Z direction is also referred to as a height direction. In description below, unless there is a particular mention of a state, each element will be described on the premise of the cartridge mounting portion 6 in an initial disposition state in which each cartridge 4 is not mounted in the cartridge mounting portion 6.

As illustrated in FIG. 3, the cartridge mounting portion 6 includes a receiving chamber 61 within which the cartridges 4 are received. The receiving chamber 61 has a substantially rectangular parallelepiped shape. The receiving chamber 61 includes slots 61C, 61M, 61Y, and 61K which receive, respectively, the cartridges 4C, 4M, 4Y, and 4K, and which have, respectively, outer shapes substantially corresponding to outer shapes of the cartridges 4C, 4M, 4Y, and 4K. In this embodiment, the cartridge 4K has an X direction size greater than those of the other cartridges 4C, 4M, and 4Y so that the cartridge 4K has a larger amount of the liquid contained within the cartridge 4K. Accordingly, a width of the slot 61K is greater than widths of the other slots 61C, 61M, and 61Y.

As illustrated in FIG. 3, the cartridge mounting portion 6 includes six device walls 62, 63, 64, 65, 66, and 67 forming the receiving chamber 61. In this disclosure, "wall" includes, in addition to a single wall, a wall constituted by a plurality of walls. The first device wall 67 includes the insertion/extraction opening portion 674 through which the cartridges 4 are inserted into and detached from the receiving chamber 61. The second device wall 62 constitutes a wall of the receiving chamber 61 on the −Y direction side. The second device wall 62 confronts the first device wall 67 in the Y direction.

The device upper wall 63 constitutes a wall of the receiving chamber 61 on the +Z direction side. The device bottom wall 64 confronts the device upper wall 63 in the Z direction. The device bottom wall 64 constitutes a wall of the receiving chamber 61 on the −Z direction side. The device bottom wall 64 is constituted by support members 610. The device bottom wall 64 includes a plurality of device opening portions 614. In this embodiment, the four device opening portions 614 are formed to correspond to the slots 61C, 61M, 61Y, and 61K. The device upper wall 63 and the device bottom wall 64 are intersected with the second device wall 62 and the first device wall 67. In this disclosure, "cross" and "intersect" means either (i) a state in which two elements are actually crossed with each other, (ii) a state in which one element and the other element are crossed with each other in a case where the one element extends, or (iii) a state in which two elements are crossed with each other in a case where the two respective elements extend.

As illustrated in FIG. 3, the cartridge mounting portion 6 further includes the support members 610, the liquid inlet portions 642, device side supply portion positioning portions 644, and device guiding portions 602. A plurality of the support members 610 are provided in accordance with the number of the cartridges 4 to be mounted. In this embodiment, four support members 610 are provided. The support members 610 constitute the device bottom wall 64 of the receiving chamber 61 on the downward side of the gravity direction. Each of the support members 610 supports corresponding one of the cartridges 4 from the −Z direction side which is the downward side of the gravity direction. Each support member 610 extends along the Y direction. Each support member 610 has a recessed shape. Each support member 610 includes a main wall 613 constituting the device bottom wall 64, a first support side wall 611, and a second support side wall 612.

Each of the main walls 613 forms a bottom portion which is positioned on the downward side of the gravity direction and which has a recessed shape. Each main wall 613 includes an end which is on the first device wall 67 side and which includes the device opening portion 614. Each of the device opening portions 614 penetrates through corresponding one of the main walls 613 in a thickness direction of the one main wall 613.

As illustrated in FIG. 3, each of the first support side walls 611 is raised from a +X direction end portion of corresponding one of the main walls 613 in the +Z direction which is the upward direction of the gravity direction. Each of the second support side walls 612 is raised from a −X direction end portion of corresponding one of the main walls 613 in the +Z direction which is the upward direction of the gravity direction. Each of the first support side walls 611 and corresponding one of the second support side walls 612 confront each other in the X direction.

Each of the device guiding portions 602 is configured to guide corresponding one of the cartridges 4 in the insertion direction D1 and in the detachment direction D4. Each of the device guiding portions 602 is provided to corresponding one of the support members 610. The device guiding portions 602 are provided to the respective first support side wall 611 and second support side wall 612. The device guiding portions 602 are protrusions provided to the first support side wall 611 and the second support side wall 612.

As illustrated in FIG. 3, each of the liquid inlet portions 642 is configured to receive the liquid of corresponding one of the cartridges 4. Each liquid inlet portion 642 includes a center axis CA1. In the initial disposition state of the cartridge mounting portion 6, the liquid inlet portion 642 is not positioned within the receiving chamber 61. The liquid inlet portion 642 is positioned on the −Z direction side with respect to the receiving chamber 61. That is, the liquid inlet portion 642 is positioned on an opposite side from the receiving chamber 61 with respect to the support member 610. In this embodiment, a tip end portion 642*b* of the liquid inlet portion 642 is configured to be disposed within the receiving chamber 61 by moving and rotating the support member 610 in the rotation mounting direction D2 around the rotation fulcrum 698 to move the device opening portion 614 in the downward direction. That is, the rotation fulcrum 698 is configured to move and rotate the support member 610 to displace the device opening portion 614 downward in the gravity direction and to thereby dispose the tip end portion 642*b* of the liquid inlet portion 642 within the receiving chamber 61 through the device opening portion 614.

Each of the device side supply portion positioning portions 644 illustrated in FIG. 3 is configured to be received within a supply portion positioning portion (described later) of the corresponding cartridge 4 and to thereby restrict a movement of the liquid supply portion of the cartridge 4 with respect to the liquid inlet portion. With this, the liquid supply portion of each cartridge 4 is positioned. In the initial state of the cartridge mounting portion 6, each device side supply portion positioning portion 644 is not positioned within the receiving chamber 61. Each device side supply portion positioning portion 644 is positioned on the −Z direction side with respect to the receiving chamber 61. That is, the device side supply positioning portion 644 is positioned on an opposite side from the receiving chamber 61 with respect to the support member 610. A tip end portion of each device side supply portion positioning portion 644 is configured to be disposed within the receiving chamber 61 by moving and rotating the corresponding support member 610 in the rotation mounting direction D2 around the rotation fulcrum 698 to move the device opening portion 614 in the downward direction. That is, the rotation fulcrum 698 is configured to move and rotate the support member 610 to displace the device opening portion 614 and to thereby dispose the tip end portion of the device side supply portion positioning portion 644 within the receiving chamber 61 through the device opening portion 614.

As illustrated in FIG. 3, the cartridge mounting portion 6 further includes device side terminal portions 70. Each of the device side terminal portions 70 includes a device side terminal to be in contact with a cartridge side terminal of the corresponding cartridge 4 in the mounted state of the cartridge 4.

Figure 4:
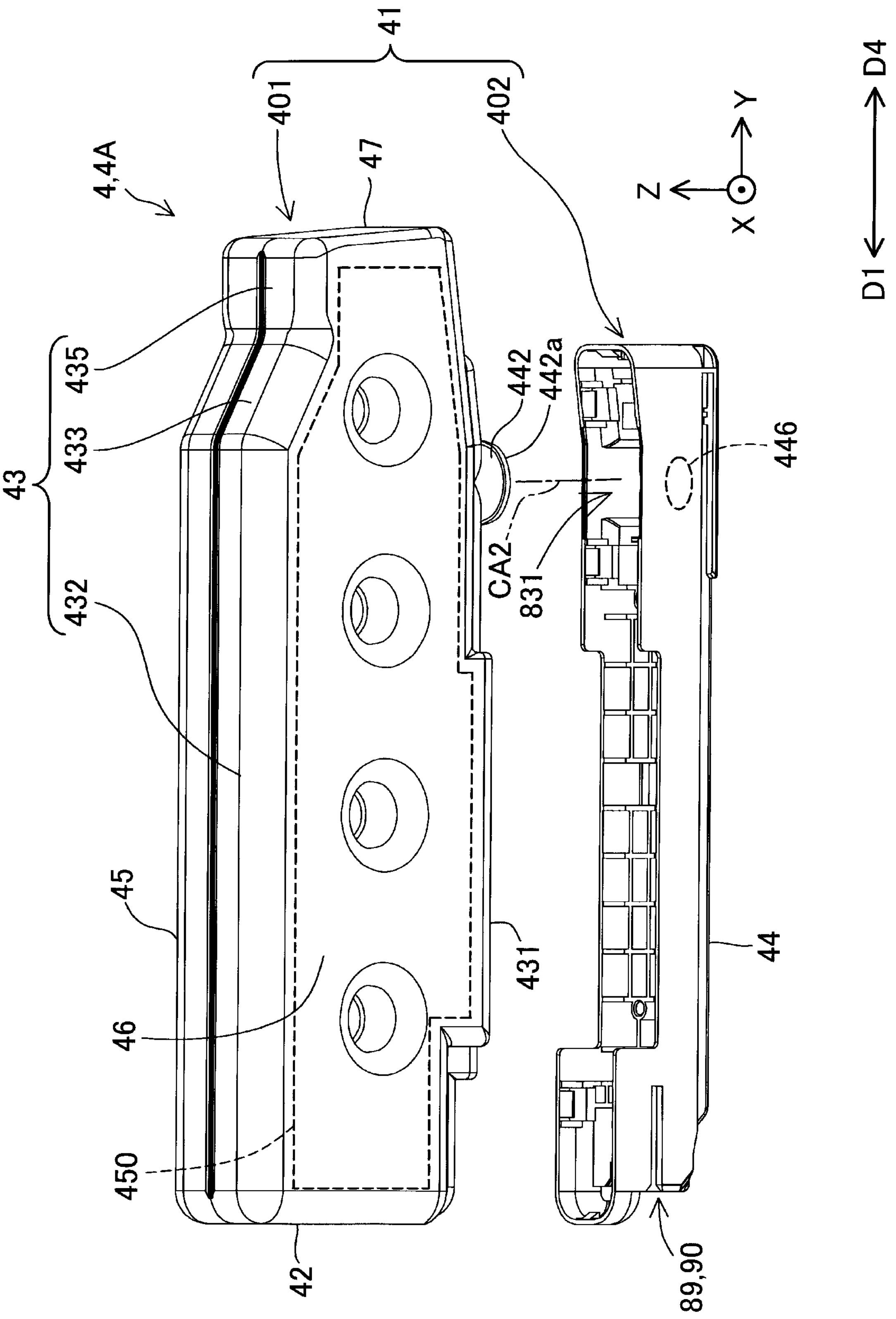
FIG. 4 is an exploded perspective view of a first type cartridge.
Figure 5:
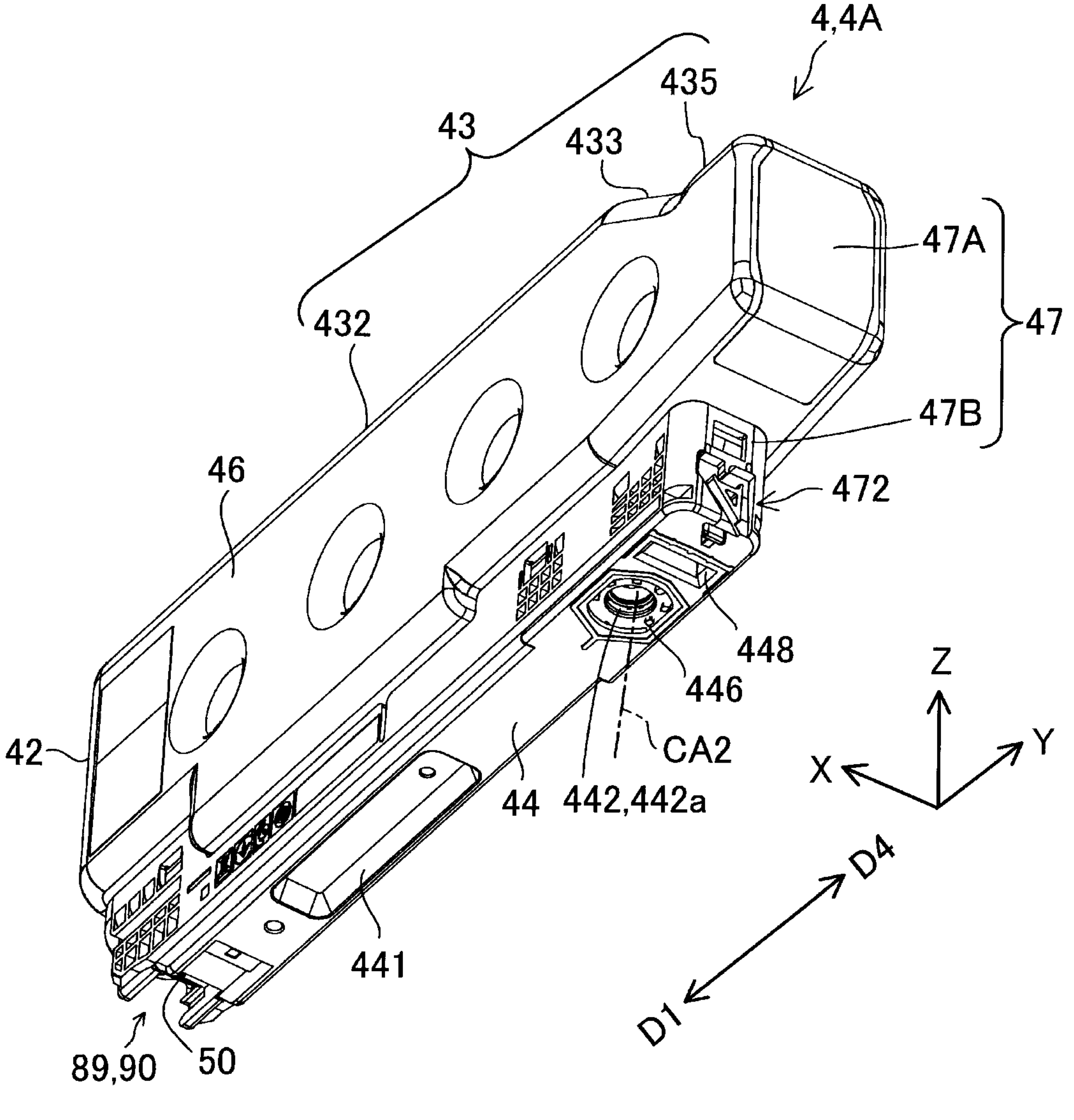
FIG. 5 is a perspective view of the first type cartridge.

FIG. 4 is an exploded perspective view of the first type cartridge 4A. FIG. 5 is a perspective view of the first type cartridge 4A. The XYZ axes shown in FIG. 4 and FIG. 5 are based on the insertion posture of each cartridge 4 into the cartridge mounting portion 6. The insertion posture is identical to a posture of the cartridge 4 in a state in which the insertion of the cartridge 4 into the cartridge mounting portion 6 is finished. A different point between the first type cartridge 4A and the second type cartridge 4B is a width of the liquid containing member 401. A width of the first type cartridge 4A is larger than a width of the second type cartridge 4B. Accordingly, a volume of the liquid containing portion 450 of the first type cartridge 4A is larger than a volume of the liquid containing portion 450 of the second type cartridge 4B. The other configurations of the first type cartridge 4A are identical to the other configures of the second type cartridge 4B. Hereinafter, the configuration of the cartridges 4 is explained by using the first type cartridge 4A.

As illustrated in FIG. 5, an outer shape of the cartridge 4 is a substantially rectangular parallelepiped shape. In the cartridge 4, a longitudinal (longer side) direction is a direction along the −Y direction which is the insertion direction D1 of the cartridge 4 into the cartridge mounting portion 6. A lateral (shorter side) direction which is a widthwise direction is the X direction. The −Z direction is the downward direction of the gravity direction, that is, the height direction. A size in the longitudinal direction is largest in the cartridge 4. A size in the lateral direction is smallest in the cartridge 4. The widthwise direction is a direction which is perpendicular to the insertion direction D1 and the gravity direction in the insertion posture.

As illustrated in FIG. 4, in this embodiment, the cartridge 4 is constituted by two members. That is, the cartridge 4 includes the liquid containing member 401 and an adapter 402 fit and mounted on the liquid containing member 401. The cartridge 4 may be an integral member of the liquid containing member 401 and the adapter 402.

The liquid containing member 401 includes a liquid containing portion 450 containing the ink which is the liquid and a liquid supply portion 442. The liquid supply portion 442 communicates with the liquid containing portion 450. The liquid supply portion 442 extends from a bottom surface of the liquid containing member 401. The liquid supply portion 442 has a center axis CA2. The center axis CA2 is in parallel with the Z direction in the insertion state. A direction along the center axis CA2 is also referred to as a center axis direction. In this embodiment, the insertion direction D1 is perpendicular to the center axis direction along the center axis CA2. The liquid supply portion 442 may be disposed in a posture in which the liquid supply portion 442 is inclined with respect to the Z axis. For example, in the liquid supply portion 442, an angle attained by the center axis CA2 and the Z axis may be greater than zero degrees and equal to or smaller than 15 degrees.

The adapter 402 is mounted to the bottom side of the liquid containing member 401. The adapter 402 includes a supply portion disposition portion 831 which has a recessed shape and which receives the liquid supply portion 442. The supply portion disposition portion 831 includes an insertion opening portion 446 formed on a bottom surface of the supply portion disposition portion 831. The liquid inlet portion 642 is inserted into the insertion opening portion 446. The insertion opening portion 446 confronts, in the Z direction, a supply portion tip end portion 442*a* which is a tip end opening of the liquid supply portion 442.

The liquid containing member 401 and the adapter 402 are molded by, for example, injection-molding a synthetic resin such as polypropylene. The liquid containing member 401 and the adapter 402 may be made of the same material. The liquid containing member 401 and the adapter 402 may be made of different materials.

As illustrated in FIG. 4, the cartridge 4 includes a first side surface 42, an upper surface 43, a bottom surface 44, a second side surface 45, a third side surface 46, and a fourth side surface 47. The first side surface is also referred to as a "front surface". The fourth side surface is also referred to as a "rear surface". That is, in this disclosure, the "front surface" is a surface positioned on the far side in the insertion direction D1. The "rear surface" is a surface on the near side in the insertion direction D1.

The front surface 42 and the rear surface 47 confronts each other in the insertion posture in the Y direction along the insertion direction D1. The front surface 42 constitutes a −Y direction tip end surface which is on the far side in the insertion direction D1 in the insertion posture, that is, a tip end side in the insertion direction D1. The rear surface 47 constitutes a surface positioned on the near side in the insertion direction D1 in the insertion posture, that is, the +Y direction side which is the detachment direction D4 in which the cartridge 4 is detached from the cartridge mounting portion 6.

As illustrated in FIG. 5, the upper surface 43 and the bottom surface 44 confront each other in the Z direction which is the center axis direction of the center axis CA2. The bottom surface 44 is positioned on the lower side in the insertion state of the cartridge 4. The bottom surface 44 includes a receiving portion 441 and a supply portion positioning portion 448 in addition to the above-described liquid supply portion 442 and the above-described insertion opening portion 446.

The receiving portion 441 is a recessed portion opened on the bottom surface 44. The receiving portion 441 may be omitted. In the mounting process, the supply portion positioning portion 448 is configured to receive the device side supply portion positioning portion 644 illustrated in FIG. 3 and to thereby position the liquid supply portion 442 with respect to the liquid inlet portion 642. The supply portion positioning portion 448 is a recessed portion opened on the bottom surface 44, similarly to the receiving portion 441.

The upper surface 43 is positioned on the upper side in the insertion state of the cartridge 4. The upper surface 43 connects the front surface 42 and the rear surface 47. As illustrated in FIG. 4, the upper surface 43 includes a main surface 432, an inclination surface 433, and an operation surface 435.

As illustrated in FIG. 4, the second side surface 45 and the third side surface 46 confront each other in the X direction which is the widthwise direction. Each of the second side surface 45 and the third side surface 46 is parallel to the Y direction and the Z direction in the insertion posture. The second side surface 45 is a surface positioned on the −X direction side. The third side surface 46 is a surface positioned on the +X direction side.

A corner portion 89 is provided to a corner portion at which the front surface 42 and the bottom surface 44 are intersected with each other. The corner portion 89 includes a terminal disposition portion 90 which has a recessed shape inwardly recessed. A circuit substrate 50 is disposed in the terminal disposition portion 90.

As illustrated in FIG. 5, the rear surface 47 includes a main surface 47A connected with the upper surface 43 and a stepped surface 47B connected with the bottom surface 44. The stepped surface 47B is positioned on the far side of the main surface 47A in the insertion direction D1, that is, on the −Y directions side. The stepped surface 47B is a surface perpendicular to the bottom surface 44. The stepped surface 47B constitutes the +Y direction side surface in the insertion posture. The stepped surface 47B is raised from the bottom surface 44 toward the upper surface 43 side. The rear surface 47 includes the second fixing structure 472 in the stepped surface 47B. In this embodiment, the second fixing structure 472 has a heart cam structure. Details of the second fixing structure 472 are described later. In the mounting state of the cartridge 4, the second fixing structure 472 is configured to lock (retain) the first fixing structure and to thereby restrict the movement of the cartridge 4 in the Z direction. In below-described explanations, a state in which the second fixing structure 472 locks the first fixing structure is referred to as a "locking state".

Figure 6:
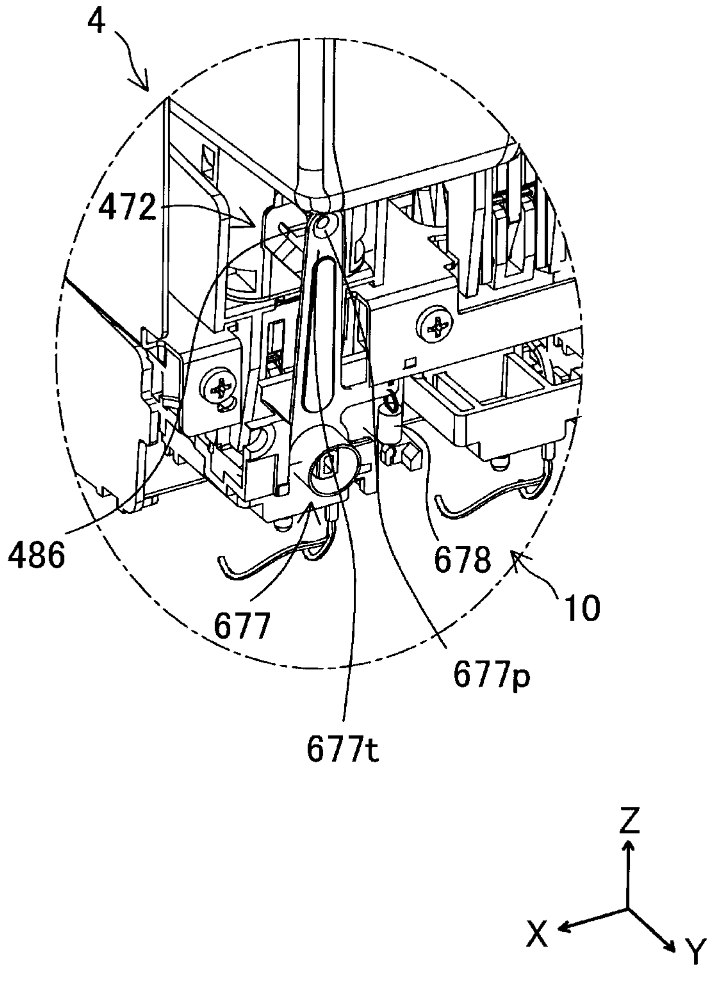
FIG. 6 is a view illustrating a locking state between a first fixing structure and a second fixing structure in the first embodiment.

FIG. 6 is a view illustrating the locking state between the first fixing structure 677 and the second fixing structure 472 in the first embodiment. In this embodiment, the first fixing structure 677 of the printing device 10 has an arm-shaped configuration. The first fixing structure 677 extends toward the +Z direction side so that the first fixing structure 677 can enter the second fixing structure 472 of the cartridge 4 to be mounted. The first fixing structure 677 is provided to allow an X direction pivot movement of the upper end side on the +Z direction side around the lower end side on the −Z direction side. The first fixing structure 677 is urged by an urging member 678 so that the upper end side on the +Z direction side is displaced toward the −X direction side. The first fixing structure 677 includes a tip end portion 677*t* which is a tip end on the +Z direction side. Moreover, the tip end portion 677*t* is provided with a protruding portion 677*p*. The protruding portion 677*p* protrudes from the tip end portion 677*t* toward the −Y direction side. In FIG. 6, a locking portion 486 of the second fixing structure 472 locks the protruding portion 677*p* of the first fixing structure 677 to be brought to the locking state. This state is also the mounting state of the cartridge 4. That is, the second fixing structure 472 locks the first fixing structure 677 in the mounting state.

Figure 7:
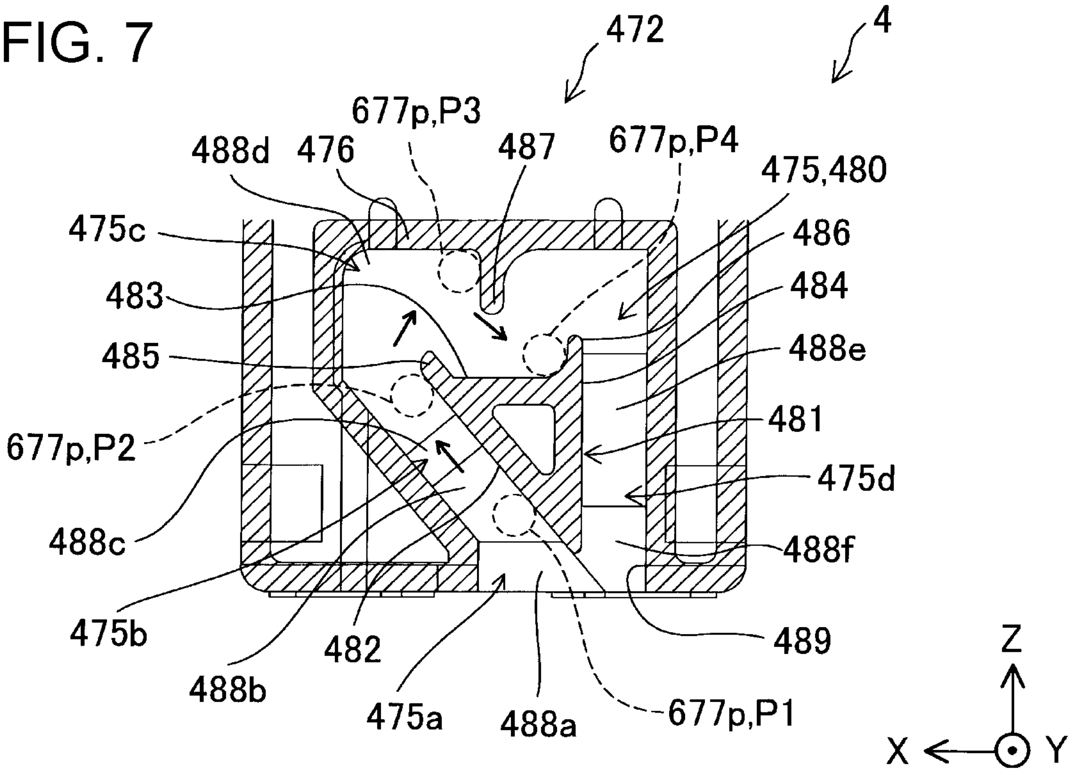
FIG. 7 is a schematic view for explaining a mechanism until the locking is finished.
Figure 8:
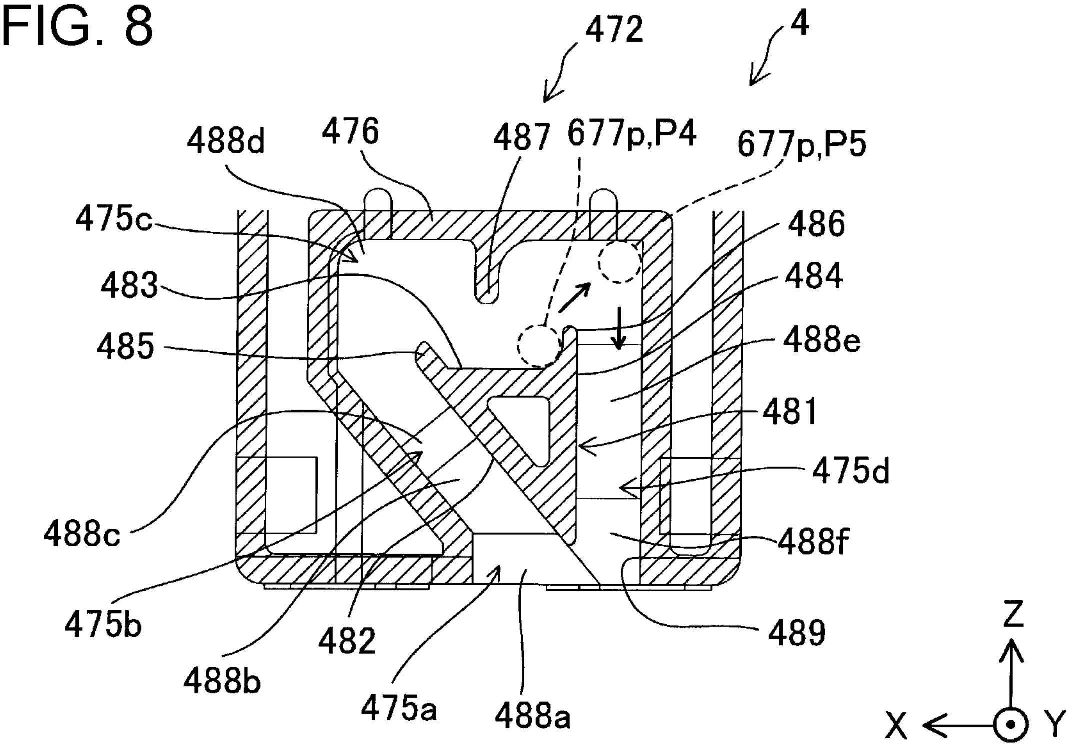
FIG. 8 is a schematic view for explaining a mechanism when the locking state is released.

FIG. 7 is a schematic view for explaining a mechanism until the locking between the first fixing structure 677 and the second fixing structure 472 is finished. FIG. 8 is a schematic view for explaining a mechanism when the locking state between the first fixing structure 677 and the second fixing structure 472 is released. FIG. 7 and FIG. 8 each illustrate the second fixing structure 472 when viewed in the −Y direction. Moreover, in FIG. 7 and FIG. 8, positions P1 to P5 of the protruding portion 677*p* at different timings are shown by broken lines so as to show a movement track of the protruding portion 677*p* of the first fixing structure 677 within the groove portion 475.

The second fixing structure 472 includes a groove portion 475 which has a loop shape and which is configured to guide the first fixing structure (described later) of the printing device 10, and a locking portion 486 provided to the groove portion 475 and configured to lock the first fixing structure. In this embodiment, the groove portion 475 is formed by being surrounded by a rib 476.

A configuration of the second fixing structure 472 is explained with reference to FIG. 7. The second fixing structure 472 includes a central raised portion 481 protruding toward the +Y direction side in the center region. An outer circumference wall surface of the central raised portion 481 when viewed from the +Y direction side constitutes an outer circumference contour having a substantially triangle shape.

The outer circumference wall surface of the center raised portion 481 includes a first wall surface 482, a second wall surface 483, and a third wall surface 484. The first wall surface 482 extends in an oblique direction between the X direction and the Z direction. The second wall surface 483 extends in the X direction. The second wall surface 483 is intersected with the first wall surface 482. The third wall surface 484 extends in the Z direction. The third wall surface 484 is intersected with the first wall surface 482 and the second wall surface 483.

The central raised portion 481 includes a first protruding wall portion 485 and a second protruding wall portion 486. The first protruding wall portion 485 slightly extends from the second wall surface 483 toward the +Z direction side along the direction in which the first wall surface 482 extends, at the end portion of the second wall surface 483 on the +x direction side. The second protruding wall portion 486 is a wall portion serving as the locking portion. The second protruding wall portion 486 is the above-described locking portion 486. The second protruding wall portion 486 slightly extends from the second wall surface 483 toward the +Z direction side along the direction in which the third wall surface 484 extends, at the end portion of the second wall surface 483 on the −x direction side.

The second fixing structure 472 further includes a third protruding wall portion 487. The third protruding wall portion 487 is formed as a portion of the rib 476. The third protruding wall portion 487 extends from the rib 476 toward the −Z direction side toward the second wall surface 483, at a position at which the third protruding wall portion 487 confronts the second wall surface 483 of the central raised portion 481 in the Z direction.

For the explanation, the groove portion 475 is divided into a first groove portion 475*a*, a second groove portion 475*b*, a third groove portion 475*c*, and a fourth groove portion 475*d*. The first groove portion 475*a* extends in the Z direction as illustrated in FIG. 7. The second groove portion 475*b* confronts the first wall surface 482. The second groove portion 475*b* extends in an oblique direction between the X direction and the Z direction. The third groove portion 475*c* includes a portion confronting the second wall surface 483. The third groove portion 475*c* is formed by three protruding wall portions 485 to 487 to be meandered in the X direction. The fourth groove portion 475*d* confronts the third wall surface 484. The fourth groove portion 475*d* extends toward the first groove portion 475*a* in the −Z direction.

A first bottom surface 488*a* is a bottom surface of the first groove portion 475*a*. The first bottom surface 488*a* constitutes an inclination surface gradually raised in the +Y direction toward the +Z direction. A second bottom surface 488*b* is a bottom surface of a portion of the second groove portion 475*b* which is connected with the first groove portion 475*a*. The second bottom surface 488*b* constitutes a substantially horizontal surface. A third bottom surface 488*c* is positioned at a substantially central portion of the second groove portion 475*b*. The third bottom surface 488*c* constitutes an inclination surface recessed from the second bottom surface 488*b* in the −Y direction. A fourth bottom portion 488*d* includes a bottom surface of an end portion of the second groove portion 475*b* on the +Z direction side and a bottom surface of the third groove portion 475*c*. The fourth bottom portion 488*d* constitutes a substantially horizontal surface. A fifth bottom surface 488*e* is a bottom surface of the fourth groove portion 475*d*. The fifth bottom surface 488*e* constitutes an inclination surface gradually raised in the +Y direction toward the −Z direction. A sixth bottom surface 488*f* is a bottom surface between the first bottom surface 488*a* and the fifth bottom surface 488*e*. The sixth bottom surface 488*f* constitutes a substantially horizontal surface.

The mechanism until the locking between the locking portion 486 of the second fixing structure 472 and the protruding portion 677*p* of the first fixing structure 677 is finished is explained with reference to FIG. 7. In a case in which the cartridge 4 is rotated and moved in the rotation mounting direction D2 by receiving the force in the downward direction of the gravity direction, the second fixing structure 472 is pushed toward the −Z direction side. With this, the protruding portion 677*p* provided at the tip end portion 677*t* of the first fixing structure 677 is inserted into the first groove portion 475*a* in the +Z direction. When the protruding portion 677*p* is inserted into the first groove portion 475*a* in the +Z direction, the protruding portion 677*p* is in contact with the first bottom surface 488*a* which is the inclination surface and the protruding portion 677*p* is pushed toward the +Y direction side by the first bottom surface 488*a*. When the second fixing structure 472 is further pushed toward the −Z direction side, the protruding portion 677*p* is away from the rib 476. The protruding portion 677*p* rides on the flat second bottom surface 488*b*. The first fixing structure 677 is urged by the urging member (not shown) toward the −X direction side. Accordingly, when the protruding portion 677*p* rides on the second bottom surface 488*b*, the protruding portion 677*b* reaches a position P1 at which the protruding portion 677*b* is in contact with the first wall surface 482.

The protruding portion 677*p* of the first fixing structure 677 is moved toward the +Z direction side along the first wall surface 482 on the second bottom surface 488*b* while being pushed in the +X direction by the first wall surface 482. Then, the protruding portion 677*p* passes through the third bottom surface 488*c*. The protruding portion 677*b* reaches a position P2 at which the protruding portion 677*b* is in contact with the first protruding wall portion 485.

When the protruding portion 677*p* of the first fixing structure 677 is further moved toward the +Z direction side to be apart from the first protruding wall portion 485, the protruding portion 677*p* is instantaneously moved toward the −X direction side by the urging force applied in the −X direction, so that the protruding portion 477*p* collides against the third protruding wall portion 487. By this collision, a click is generated. At this time, the protruding portion 677*p* of the first fixing structure 677 reaches the position P3.

When the user releases the force to the cartridge 4 toward the −Z direction side in response to this click, the cartridge 4 receives an urging force toward the +Z direction side by an urging member (described later) of the cartridge mounting portion 6, so that the cartridge 4 is slightly moved toward the +Z direction side. With this, the protruding portion 677*p* of the first fixing structure 677 is moved in the −Z direction along the third protruding wall portion 487 to be apart from the third protruding wall portion 487. At this time, the protruding portion 677*p* is instantaneously moved toward the −X direction side by the urging force in the −X direction. The protruding portion 677*p* collides against the second wall surface 483 and the second protruding wall portion 486 which is the locking portion, and the protruding portion 677*p* is caught at the position P4.

In this way, at the position P4, the protruding portion 677*p* of the first fixing structure 677 is locked by the locking portion 486 of the second fixing structure 472. In this state, the movement of the cartridge 4 in the +Z direction is restricted by the protruding portion 677*p* of the first fixing structure 677. This state is the mounting state of the cartridge 4.

Next, the mechanism in which the locking state between the second fixing structure and the first fixing structure 677 is released is explained with reference to FIG. 8. In this embodiment, in the mounting state, when the operation surface of the cartridge 4 is further pushed in the −Z direction, the locking state is released. When the user pushes the operation surface 435 in the −Z direction, the protruding portion 677*p* of the first fixing structure 677 is moved from the position P4 in the +Z direction, so as to be released from the state in which the first fixing structure 677 is locked with the second protruding wall portion 486 which is the locking portion. At this time, the protruding portion 677*p* instantaneously moves toward the −X direction side by the urging force acted on the first fixing structure 677 toward the −X direction by the urging member, and the protruding portion 677*p* collides against the side wall surface of the rib 476 on the −X direction side to reach the position P5.

When the protruding portion 677*p* of the first fixing structure 677 moves to the position P5, the protruding portion 677*p* is positioned in the fourth groove portion 475*d*. Accordingly, the first fixing structure 677 is allowed to move in the −Z direction. That is, the locking state between the second fixing structure 472 and the first fixing state 677 is released. By the click due to the above-described collision of the protruding portion 677*p* against the rib 476, the user can know the release of the locking state between the second fixing structure 472 and the first fixing structure 677. In a case in which the protruding portion 677*p* is movable in the −Z direction, the cartridge 4 is moved in the +Z direction by the urging member (described later) of the cartridge mounting portion 6. Accordingly, the protruding portion 677*p* moves in the −Z direction, so that the protruding portion 677*p* can escape from the second fixing structure 472.

By the above-described mechanisms, when the force in the downward direction of the gravity direction is applied to the operation surface 435 in the insertion state of the cartridge 4, the cartridge 4 is rotated and moved to be brought to the mounting state. The second fixing structure 472 locks the first fixing structure 677. Moreover, in a case in which the force in the downward direction of the gravity direction is applied to the operation surface 435 in the mounting state of the cartridge 4, the locking of the second fixing structure 472 with the first fixing structure 677 is released. Accordingly, it is possible to attach and detach the cartridge 4 by applying the force to the operation surface 435. Consequently, it is possible to provide consistency of the operability of the attachment and the detachment of the cartridge since it is possible to attach and detach the cartridge 4 by applying the force to the operation surface 435.

Figure 9:
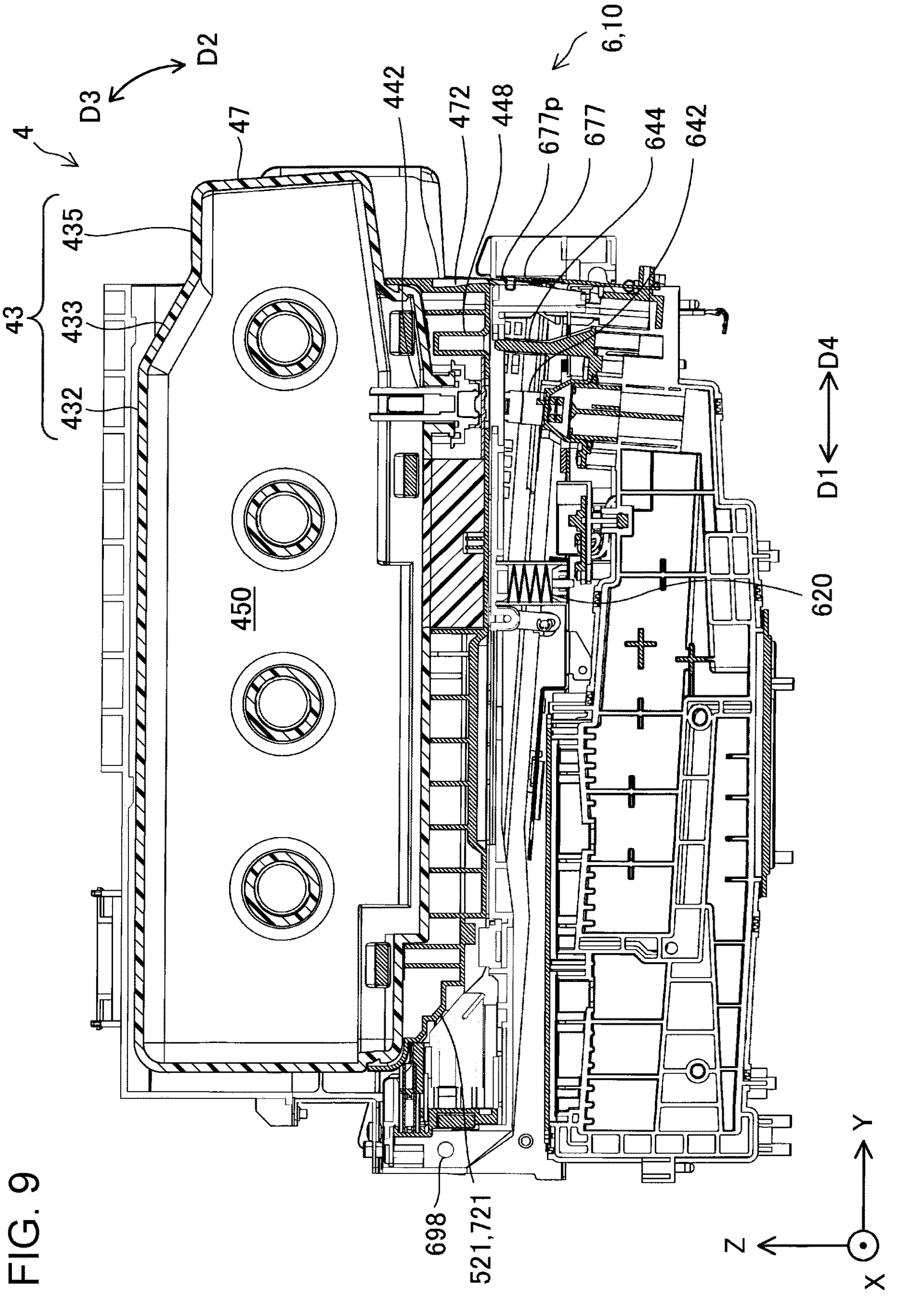
FIG. 9 is a sectional view of the cartridge and the cartridge mounting portion in an insertion state.
Figure 10:
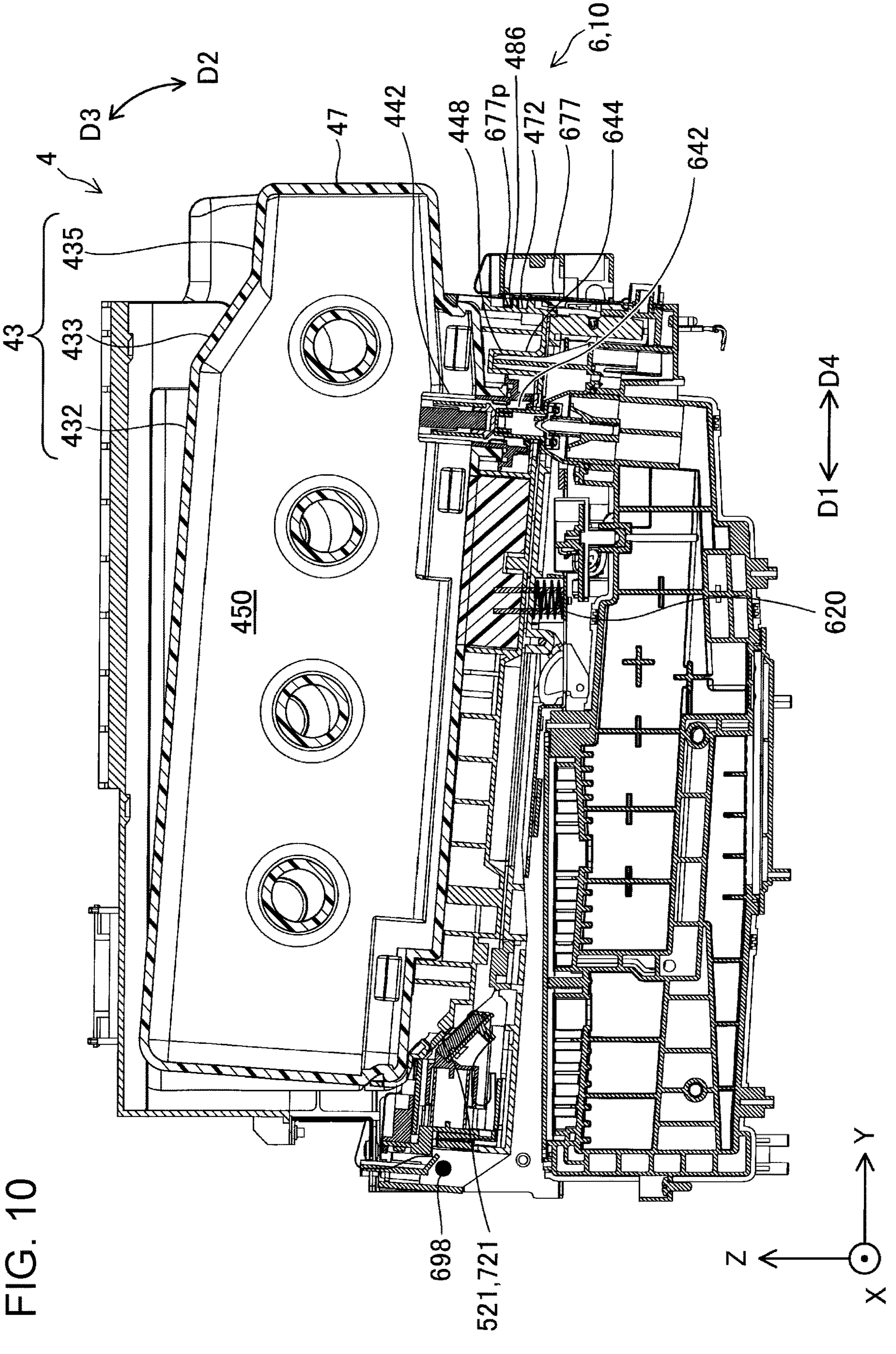
FIG. 10 is a sectional view of the cartridge and the cartridge mounting portion in a mounting state.

FIG. 9 is a sectional view of the cartridge 4 and the cartridge mounting portion 6 in the insertion state in the first embodiment. FIG. 10 is a sectional view of the cartridge 4 and the cartridge mounting portion 6 in the mounting state in the first embodiment. The cartridge 4 and the cartridge mounting portion 6 are configured to be rotated around the rotation fulcrum 698 and to thereby be brought to one of the insertion state illustrated in FIG. 9 and the mounting state illustrated in FIG. 10.

As described above, the insertion state of FIG. 9 is a state in which the cartridge 4 is inserted to the predetermined position of the cartridge mounting portion 6. The predetermined position is a position at which the cartridge side terminal 521 of the circuit substrate 50 and a device side terminal 721 of the cartridge mounting portion 6 are in contact with each other. In the insertion state, the supply portion positioning portion 448 is positioned on the +Z direction side with respect to the device side supply portion positioning portion 644. The second fixing structure 472 is positioned on the +Z direction side with respect to the first fixing structure 677. Moreover, the liquid supply portion 442 is positioned on the +Z direction side with respect to the liquid inlet portion 642.

In the insertion state illustrated in FIG. 9, when the operation surface 435 of the upper surface 43 which is positioned on the near side in the insertion direction D1 is pushed in the downward direction of the gravity direction, the cartridge 4 is rotated and moved in the rotation mounting direction D2 to be brought to the mounting state illustrated in FIG. 10. In this aspect, the operation surface 435 at the mounting of the cartridge 4 is positioned on the near side in the insertion direction D1 in the upper surface 43 of the cartridge 4. Accordingly, it is possible to improve the operability at the mounting of the cartridge 4.

The mounting state of FIG. 10 is a mounting state in which the cartridge 4 is mounted in the cartridge mounting portion 6. In this state, the supply portion positioning portion 448 is fit and mounted on the device side supply portion positioning portion 644. The second fixing structure 472 locks the first fixing structure 677. Specifically, the locking portion 486 of the second fixing structure 472 locks the protruding portion 677*p* of the first fixing structure 677. Moreover, the liquid supply portion 442 is connected with the liquid inlet portion 642. With this, the liquid contained within the liquid containing portion 450 of the cartridge 4 is supplied through the liquid supply portion 442 to the liquid inlet portion 642.

In the mounting state of FIG. 10, when the operation surface 435 is pushed in the downward direction of the gravity direction, the locking of the second fixing structure 472 of the cartridge 4 with the first fixing structure 677 is released. In this aspect, the operation surface at the detachment of the cartridge 4 is positioned on the near side in the insertion direction D1 in the upper surface 43 of the cartridge 4. Accordingly, it is possible to improve the operability at the detachment of the cartridge 4. Moreover, the surface operated by the user at the attachment and the detachment of the cartridge 4 is the same operation surface 435. Consequently, it is possible to provide the consistency of the operability.

In the mounting state illustrated in FIG. 10, when the operation surface 435 of the cartridge 4 is pushed in the downward direction of the gravity direction so as to release the locking state between the second fixing structure 472 and the first fixing structure 677, the cartridge 4 is moved in the +Z direction by the urging member 620 of the cartridge mounting portion 6. Accordingly, the cartridge 4 is rotated and moved in the connection release direction D3 to be brought to the insertion state illustrated in FIG. 9. In this case, in a process in which the cartridge 4 is moved from the position in the mounting state to the position in the insertion state, the user pushes the operation surface 435 in the downward direction of the gravity direction. On the other hand, the connection release direction D3 in which the cartridge 4 is moved from the position in the mounting state to the position in the insertion state is the upward direction of the gravity direction. Accordingly, by the operation load by the user in the downward direction of the gravity direction, it is possible to decrease the movement speed of the cartridge 4 from the position in the mounting state to the position in the insertion state. With this, it is possible to decrease the sudden disconnection between the liquid supply portion 442 and the liquid inlet portion 642 and to decrease the leakage of the ink from the liquid supply portion 442 and the liquid inlet portion 642 due to the sudden disconnection. Moreover, it is unnecessary to add a plurality of components for decreasing the movement speed of the cartridge 4 in the connection release direction D3. Accordingly, it is possible to decrease the number of the components.

In the above-described first embodiment, the second fixing structure 472 is formed on the rear surface 47 as illustrated in FIG. 5. As illustrated in FIG. 7, for the locking of the second fixing structure 472 with the first fixing structure 677, it is necessary that the cartridge 4 is pushed in the −Z direction and that the protruding portion 677*p* of the first fixing structure 677 is relatively moved toward the +Z direction side with respect to the second fixing structure 472 to reach from the position P1 to the position P3. That is, it is necessary that the cartridge 4 is moved toward the −Z direction side by a predetermine distance. In the above-described first embodiment, the cartridge 4 is rotated and moved around the rotation fulcrum 698 positioned on the far side in the insertion direction D1 as illustrated in FIG. 9 and FIG. 10. Accordingly, the rear surface 47 has a longest movement distance in the Z direction by the rotational movement since the rear surface 47 is farthest on the Y direction side from the rotation fulcrum 698. With this, the second fixing structure 472 is easy to lock the first fixing structure 677.

B. Second Embodiment

Figure 11:
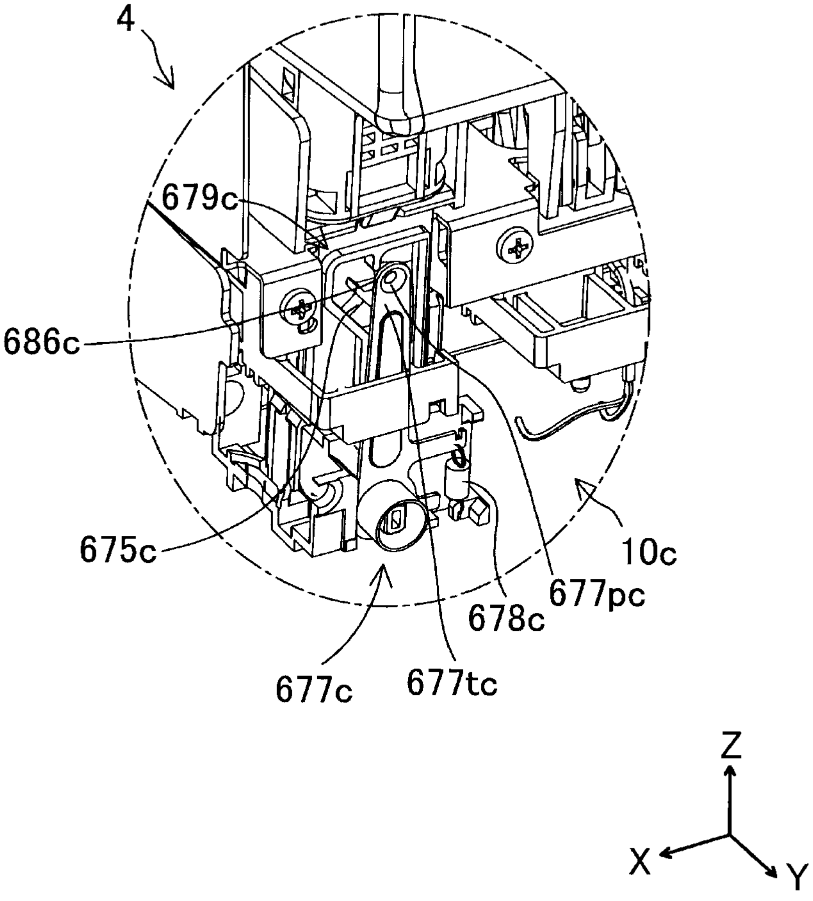
FIG. 11 is a view illustrating a locking state between the first fixing structure and the second fixing structure.

FIG. 11 is a view illustrating a locking state between a first fixing structure 677*c* and a second fixing structure 679*c* in a second embodiment. In the second embodiment, the cartridge 4 does not include the second fixing structure 472 unlike the first embodiment. A printing device 10*c* includes a second fixing structure 679*c* unlike the first embodiment. Other configurations are identical to those of the first embodiment unless specific explanations are given. Accordingly, the identical configurations are denoted by the same reference numerals, and the explanation thereof are omitted as appropriate. In the second embodiment, the second fixing structure 679*c* has a configuration identical to that of the second fixing structure 472 illustrated in FIG. 7 of the first embodiment. That is, the second fixing structure 679*c* has the heart cam structure. As illustrated in FIG. 11, the second fixing structure 679*c* includes a groove portion 675*c* which has a loop shape and which is configured to guide the first fixing structure 677*c* of the printing device 10*c*, and a locking portion 686*c* provided to the groove portion 675*c* and configured to lock the first fixing structure 677*c*. The first fixing structure 677*c* includes a tip end portion 677*tc* which is positioned at a tip end of the first fixing structure 677*c* on the +z direction side and which includes a protruding portion 677*pc*. The protruding portion 677*pc* is locked by the locking portion 686*c* of the second fixing structure 679*c* to be in the locking state. This state is the mounting state of the cartridge 4.

Figure 12:
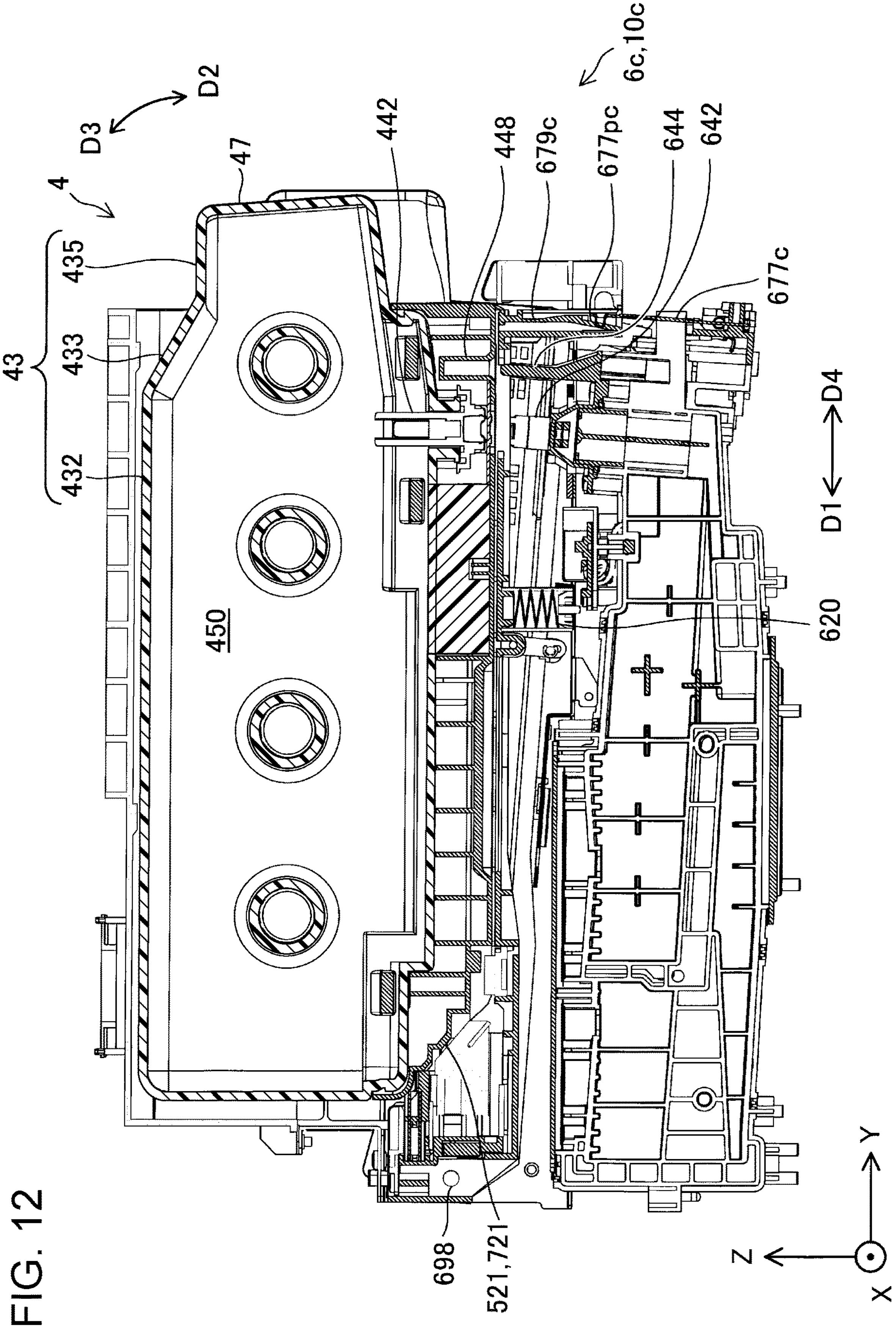
FIG. 12 is a sectional view of the cartridge and the cartridge mounting portion in the insertion state.
Figure 13:
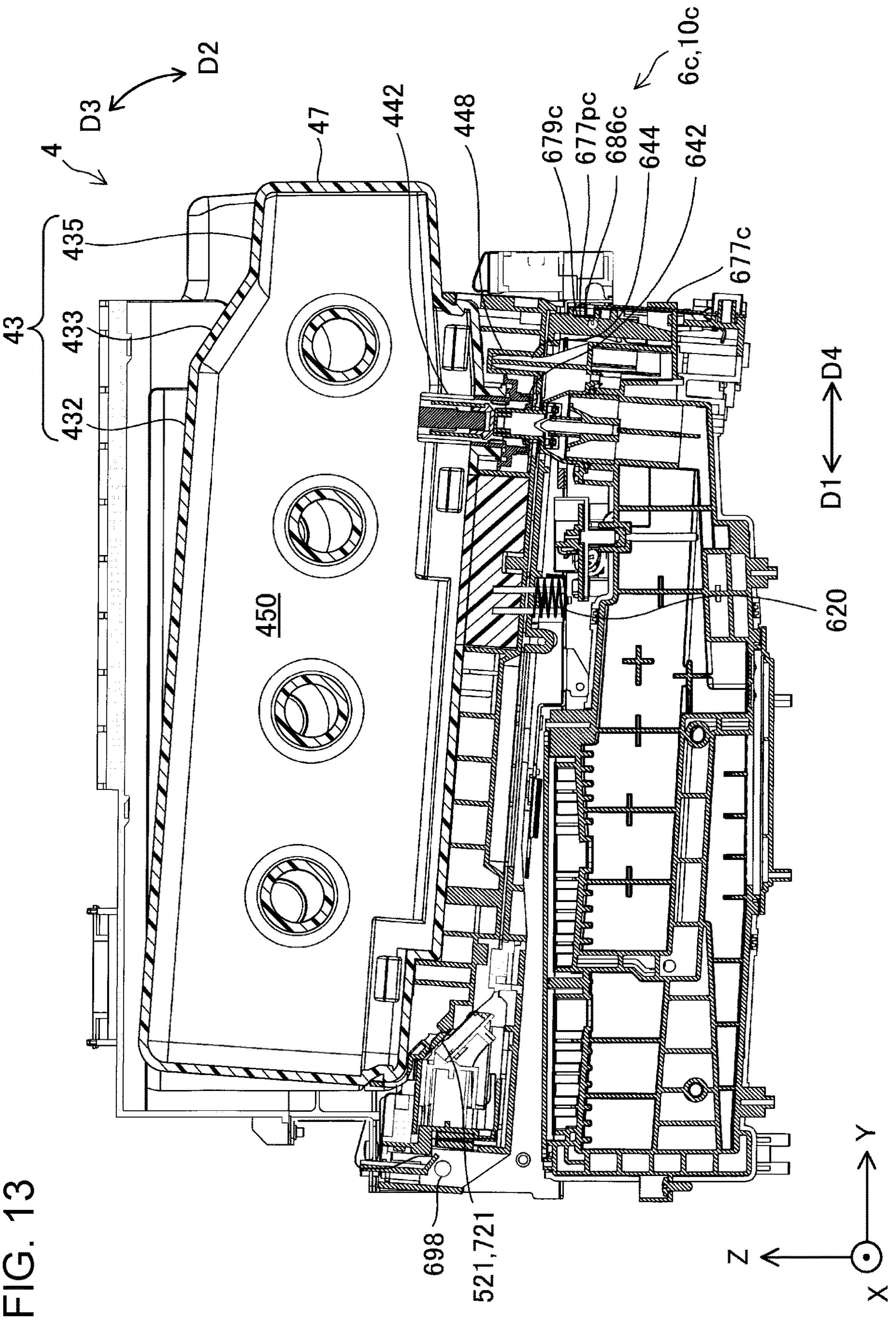
FIG. 13 is a sectional view of the cartridge and the cartridge mounting portion in the mounting state.

FIG. 12 is a sectional view illustrating the cartridge 4 and a cartridge mounting portion 6*c* in the insertion state in the second embodiment. FIG. 13 is a sectional view illustrating the cartridge 4 and the cartridge mounting portion 6*c* in the mounting state in the second embodiment.

As illustrated in FIG. 12 and FIG. 13, the printing device 10*c* includes the cartridge mounting portion 6*c* from which the cartridge 4 is detachable, the first fixing structure 677*c*, and the second fixing structure 679*c*. The cartridge mounting portion 6*c* is configured to be brought from the insertion state in which the cartridge mounting portion 6*c* supports the cartridge 4 inserted to the predetermined position in the insertion direction D1 along the horizontal direction, to the mounting state in which the cartridge mounting portion 6*c* mounts the cartridge 4 by being rotated and moved in the rotation mounting direction D2 around the rotation fulcrum 698 which is a far side of the cartridge mounting portion 6*c* in the insertion direction D1 by receiving the force having the component in the downward direction of the gravity direction. Moreover, the locking between the first fixing structure 677*c* and the second fixing structure 679*c* is released when the cartridge mounting portion 6 receives the force having the component in the downward direction of the gravity direction through the cartridge 4 in the mounting state. FIG. 12 illustrates the insertion state. FIG. 13 illustrates the mounting state.

In the insertion state illustrated in FIG. 12, the cartridge side terminal 521 of the circuit substrate 50 and the device side terminal 721 of the cartridge mounting portion 6 are in contact with each other similarly to the first embodiment illustrated in FIG. 9. The supply portion positioning portion 448 is positioned on the +Z direction side with respect to the device side supply positioning portion 644. Moreover, the liquid supply portion 442 is positioned on the +Z direction side with respect to the liquid inlet portion 642. As described above, in the second embodiment, the cartridge mounting portion 6 includes the second fixing structure 679*c*. Accordingly, the second fixing structure 679*c* in the second embodiment is positioned on the −Z direction side relative to the second fixing structure 472 in the first embodiment illustrated in FIG. 9. In accordance with the position of the second fixing structure 679*c* on the −Z direction side with respect to the second fixing structure 472, the first fixing structure 677*c* illustrated in in FIG. 12 is positioned on the −Z direction side relative to the first fixing structure 677*c* illustrated in FIG. 9. The first fixing structure 677 in the first embodiment and the first fixing structure 677*c* in the second embodiment have an identical length in the Z direction.

The mounting state illustrated in FIG. 13 is a mounting state in which the cartridge 4 is mounted in the cartridge mounting portion 6*c*. In this state, the supply portion positioning portion 448 is fit and mounted on the device side supply portion positioning portion 644. The first fixing structure 677*c* and the second fixing structure 679*c* are locked with each other. Specifically, the locking portion 686*c* of the second fixing structure 679*c* is configured to lock the protruding portion 677*pc* of the first fixing structure 677*c*. Furthermore, the liquid supply portion 442 is connected with the liquid inlet portion 642. With this, the liquid contained within the liquid containing portion 450 of the cartridge 4 is supplied through the liquid supply portion 442 to the liquid inlet portion 642.

As illustrated in FIG. 12 and FIG. 13, the second fixing structure 679*c* is interlinked with the cartridge mounting portion 6*c*. Specifically, the second fixing structure 679*c* is mounted to a +Y direction side end portion of the support member 610. The second fixing structure 679*c* is interlinked with the movement of the support portion 610. In this aspect, when the second fixing structure 679*c* of the printing device 10*c* receives the force in the downward direction of the gravity direction in the insertion state, the second fixing structure 679*c* is rotated and moved in the rotation mounting direction D2. Accordingly, it is possible to lock the first fixing structure 677*c* of the printing device 10*c*. Similarly, in the mounting state, the second fixing structure 679*c* is moved in the rotation mounting direction D2 by receiving the force in the downward direction of the gravity direction. With this, it is possible to release the locking between the first fixing structure 677*c* and the second fixing structure 679*c*. When the locking between the first fixing structure 677*c* and the second fixing structure 679*c* is released, the cartridge mounting portion 6*c* is moved, by the urging member 620, to the position in the insertion state illustrated in FIG. 12.

Moreover, in the above-described second embodiment, the cartridge mounting portion 6*c* of the printing device 10*c* is moved from the position in the insertion state to the position in the mounting state by the force applied to the operation surface 435 of the cartridge 4 in the downward direction of the gravity direction. With this, the first fixing structure 677*c* and the second fixing structure 679*c* of the printing device 10*c* are locked with each other. Similarly, in the mounting state, the locking between the first fixing structure 677*c* and the second fixing structure 679*c* is released by the force applied to the operation surface 435 of the cartridge 4 in the downward direction of the gravity direction. Accordingly, it is possible to attach and detach the cartridge 4 by the force applied to the operation surface 435 and to thereby provide the consistency of the operability at the attachment and the detachment of the cartridge.

C. Other Embodiments (C1) In the above-described first embodiment, the upper surface 43 includes the main surface 432, the inclination surface 433, and the operation surface 435. However, the upper surface 43 may not include the main surface 432, the inclination surface 433, or the operation surface 435.

(C2) In the above-described first embodiment, the rear surface 47 includes the stepped surface 47B. However, the rear surface 47 may not include the stepped surface.

(C3) This disclosure is applicable to cartridges mounted to any printing device configured to eject other liquid other than the ink, in addition to the ink jet printer and the ink jet cartridge thereof. For example, this disclosure is applicable to below-described various printing device and cartridges thereof:

(1) an image recording device such as a facsimile device;

(2) a printing device configured to eject a coloring material used in manufacturing of a color filter for an image displaying device such as a liquid crystal display;

(3) a printing device configured to eject an electrode material used for forming electrodes of an organic EL (Electro Luminescence) display, Field Emission Display (FED), and so on;

(4) a printing device configured to eject a liquid including bioorganic substance used in manufacturing of biochips;

(5) a sample printing apparatus serving as a precision pipette;

(6) a printing device of lubricating oil;

(7) a printing device of a resin liquid;

(8) a printing device configured to eject lubricating oil in a pinpoint manner onto a precision instrument such as a clock and a camera;

(9) a printing device configured to eject a transparent resin liquid such as an ultraviolet curing liquid resin onto a substrate to form a minute hemispherical microlens (an optical lens) used in an optical communication element, and so on;

(10) a printing device configured to eject an acid or alkaline etchant to perform etching of a substrate, and so on; and

(11) a printing device including a liquid ejecting head configured to eject any other minute liquid droplets.

Note that the term "liquid droplets" refers to a state of liquid ejected from the printing device, and examples thereof include a granular shape, a tear shape, and a thread-like trailing shape. Further, the term "liquid" here refers to any material that is able to be ejected by the printing apparatus. For example, "liquid" may be any material as long as it is a material in a state in which a substance is in a liquid phase, and examples thereof include a liquid-state material having high or low viscosity and a liquid-state material such as a sol, gel water, other inorganic solvents, an organic solvent, a solution, a liquid resin, and a liquid metal. Examples of the "liquid" further include, in addition to liquid as one state of a substance, materials in which particles of an inorganic material having solids such as pigments and metal particles are dissolved, dispersed, or mixed in a solvent. In addition, representative examples of liquid include ink as described in the embodiments described above, liquid crystal, and the like. Examples of the ink include various liquid compositions such as typical water-based ink, oil-based ink, gel ink, and hot-melt ink.

D. Other Aspects

This disclosure is not limited to the above-described embodiments. This disclosure can be attained by various configurations as long as they are not deviated from the gist of the disclosure. For example, to solve some or all of the above-described problems or to achieve some or all of the above-described effects, technical features in the embodiments corresponding to technical features in the aspects described in SUMMARY can be replaced or combined as appropriate. The technical features can be omitted as appropriate unless the technical features are described as essential in the present specification.

(1) According to a first aspect of this disclosure, there is provided a cartridge configured to be detachably mounted to a cartridge mounting portion of a printing device. The cartridge includes a second fixing structure including a groove which has a loop shape and which is configured to guide a first fixing structure of the printing device, and a locking portion provided to the groove and configured to lock the first fixing structure. The cartridge is configured to be brought from an insertion state to a mounting state, the insertion state being a state in which the cartridge is inserted to a predetermined position of the cartridge mounting portion by being moved in an insertion direction along a horizontal direction, the mounting state being a state in which the cartridge is mounted in the cartridge mounting portion by being rotated and moved in a rotation mounting direction around a rotation fulcrum which is a far side of the cartridge mounting portion in the insertion direction by receiving a force having a component in a downward direction of a gravity direction. The second fixing structure is configured to lock the first fixing structure in the mounting state. The second fixing structure is configured to release locking with the first fixing structure by receiving the force has the component in the downward direction of the gravity direction which is applied to the cartridge in the mounting state.

In this aspect, the second fixing structure of the cartridge is configured to be rotated and moved by receiving the force in the downward direction of the gravity direction and to thereby be brought from the insertion state to the mounting state to lock the first fixing structure of the printing device. Moreover, the second fixing structure is configured to, in the mounting state, release the locking with the first fixing structure of the printing device by receiving the force in the downward direction of the gravity direction. Accordingly, it is possible to provide the consistency of the operability at the attachment and the detachment of the cartridge.

(2) In this aspect, the cartridge may further include an upper surface positioned on an upper side in the insertion state. The cartridge may be configured to be rotated and moved in the rotation mounting direction when an operation surface of the upper surface which is positioned on a near side in the insertion direction is pushed in the downward direction of the gravity direction in the insertion state.

In this aspect, the operation surface at the mounting of the cartridge is positioned on the near side in the upper surface of the cartridge in the insertion direction. Accordingly, it is possible to improve the operability at the mounting of the cartridge.

(3) In this aspect, the second fixing structure of the cartridge may be configured to release the locking with the first fixing structure when the operation surface is pushed in the downward direction of the gravity direction in the mounting state.

In this aspect, the operation surface at the detachment of the cartridge is positioned on the near side in the upper surface of the cartridge in the insertion direction. Accordingly, it is possible to improve the operability at the detachment of the cartridge. Moreover, the surface operated at the attachment and the detachment of the cartridge is the same operation surface. Accordingly, it is possible to provide the consistency of the operability.

(4) In this aspect, the cartridge according to claim 1 may further include a side surface in the insertion state. The second fixing structure may be formed on a rear surface positioned on a near side of the side surface in the insertion direction.

In this aspect, the second fixing structure can be formed on the rear surface of the cartridge.

(5) In the second aspect of this disclosure, there is provided a printing device. The printing device includes a cartridge mounting portion to and from which a cartridge is attached and detached, a first fixing structure, and a second fixing structure. The cartridge mounting portion is configured to be brought from an insertion state to a mounting state, the insertion state being a state in which the cartridge mounting portion supports the cartridge inserted to a predetermined position in an insertion direction along a horizontal direction, the mounting state being a state in which the cartridge mounting portion mounts the cartridge by being rotated and moved in a rotation mounting direction around a rotation fulcrum which is a far side of the cartridge mounting portion in the insertion direction by receiving a force having a component in a downward direction of a gravity direction. The second fixing structure includes a groove which has a loop shape and which is configured to guide the first fixing structure of the printing device, and a locking portion provided to the groove and configured to lock the first fixing structure. The first fixing structure and the second fixing structure are locked with each other in the mounting state, and locking between the first fixing structure and the second fixing structure is released by receiving the force having the component in the downward direction of the gravity direction in the mounting state.

In this aspect, the cartridge mounting portion of the printing device is configured to be moved from the insertion state to the mounting state by receiving the force in the downward direction of the gravity direction and to thereby lock the first fixing structure and the second fixing structure of the printing device. Similarly, in the mounting state, the locking between the first fixing structure and the second fixing structure is released by the cartridge mounting portion receiving the force in the downward direction of the gravity direction. Accordingly, it is possible to provide the consistency of the operability at the attachment and the detachment of the cartridge.

(6) In this aspect, the second fixing structure may be interlinked with the cartridge mounting portion.

In this aspect, the second fixing structure of the printing device is rotated and moved in the rotation mounting direction by receiving the force in the downward direction of the gravity direction in the insertion state. Accordingly, the second fixing structure of the printing device can lock the first fixing structure of the printing device. Similarly, in the mounting state, the second fixing structure is moved in the rotation mounting direction by receiving the force in the downward direction of the gravity direction. With this, it is possible to release the locking between the second fixing structure and the first fixing structure.

This disclosure can be attained by various aspects. This disclosure can be attained in an aspect of a method of manufacturing a cartridge, and so on, in addition to the above-described aspects.

What is claimed is:

1. A cartridge configured to be detachably mounted to a cartridge mounting portion of a printing device, the cartridge comprising:

a second fixing structure including
- a groove which has a loop shape and which is configured to guide a first fixing structure of the printing device, and
- a locking portion provided to the groove and configured to lock the first fixing structure, wherein the cartridge is configured to be brought from an insertion state to a mounting state, the insertion state being a state in which the cartridge is inserted to a predetermined position of the cartridge mounting portion by being moved in an insertion direction along a horizontal direction, the mounting state being a state in which the cartridge is mounted in the cartridge mounting portion by being rotated and moved in a rotation mounting direction around a rotation fulcrum which is a far side of the cartridge mounting portion in the insertion direction by receiving a force having a component in a downward direction of a gravity direction, the second fixing structure is configured to lock the first fixing structure in the mounting state, and the second fixing structure is configured to release locking with the first fixing structure by receiving the force having the component in the downward direction of the gravity direction which is applied to the cartridge in the mounting state.

2. The cartridge according to claim 1, further comprising:

an upper surface positioned on an upper side in the insertion state, wherein the cartridge is configured to be rotated and moved in the rotation mounting direction when an operation surface of the upper surface which is positioned on a near side in the insertion direction is pushed in the downward direction of the gravity direction in the insertion state.

3. The cartridge according to claim 2, wherein the second fixing structure of the cartridge is configured to release the locking with the first fixing structure when the operation surface is pushed in the downward direction of the gravity direction in the mounting state.

4. The cartridge according to claim 1, further comprising a side surface in the insertion state, wherein the second fixing structure is formed on a rear surface positioned on a near side of the side surface in the insertion direction.

5. A printing device comprising:

a cartridge mounting portion to and from which a cartridge is attached and detached;

a first fixing structure; and a second fixing structure, wherein the cartridge mounting portion is configured to be brought from an insertion state to a mounting state, the insertion state being a state in which the cartridge mounting portion supports the cartridge inserted to a predetermined position in an insertion direction along a horizontal direction, the mounting state being a state in which the cartridge mounting portion mounts the cartridge by being rotated and moved in a rotation mounting direction around a rotation fulcrum which is a far side of the cartridge mounting portion in the insertion direction by receiving a force having a component in a downward direction of a gravity direction, the second fixing structure includes a groove which has a loop shape and which is configured to guide the first fixing structure of the printing device, and a locking portion provided to the groove and configured to lock the first fixing structure, the first fixing structure and the second fixing structure are locked with each other in the mounting state, and locking between the first fixing structure and the second fixing structure is released by receiving the force having the component in the downward direction of the gravity direction in the mounting state.

6. The printing device according to claim 5, wherein the second fixing structure is interlinked with the cartridge mounting portion.

* * * * *